Oct. 30, 1934. W. W. LILLARD 1,978,950
FLY SWATTER
Filed Dec. 18, 1933
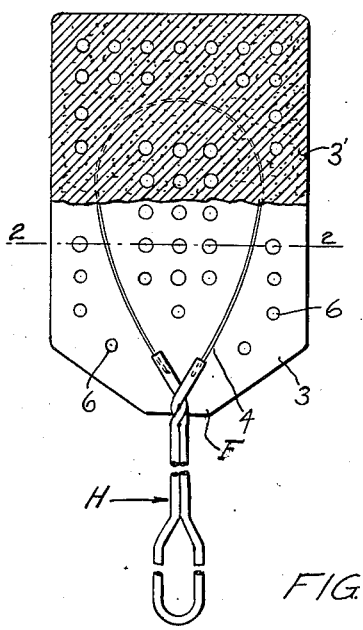
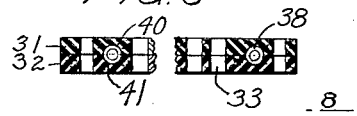
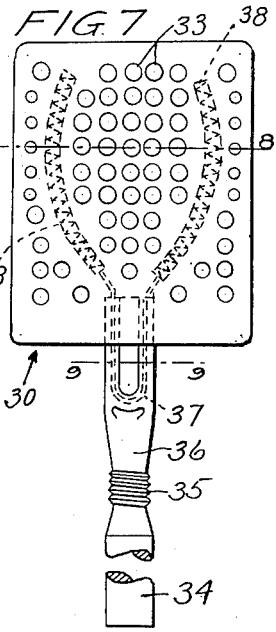
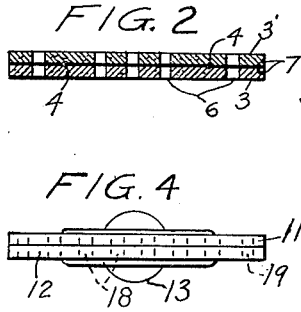
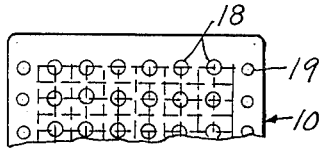
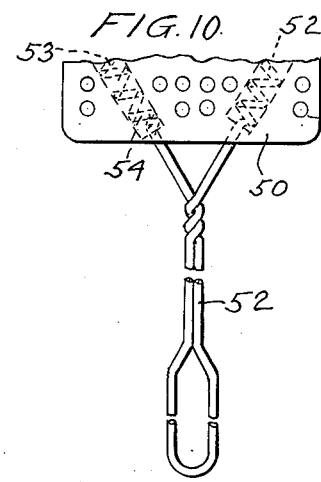
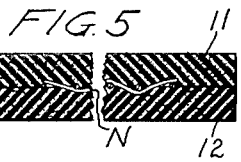
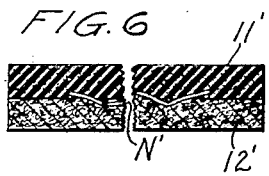
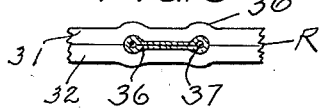
INVENTOR
Wm. W. Lillard Patented Oct. 30, 1934

1,978,950

UNITED STATES PATENT OFFICE 1,978,950

FLY SWATTER

William W. Lillard, Midland Park, N. J.

Application December 18, 1933, Serial No. 702,893

17 Claims. (Cl. 43—137)

The present invention relates to fly swatters.

Fly swatters as heretofore constructed of wire or fabric netting, perforated sheet rubber or other similar materials often crushed a fly so much upon killing it that an ugly objectionable spot of blood or body matter was left on the surface on which the fly was resting. This kind of spot is especially objectionable on a light colored wall, table cloth or curtain, and is usually difficult to remove.

An object of the present invention is the provision of a fly swatter that can be used effectively to kill or stun a fly without crushing it whereby a fly resting on a light colored surface can be killed without fear of causing an objectionable bloody spot.

I have found that a perforated slab or sheet of suitable soft material such as soft sponge rubber can be used satisfactorily to kill or stun a fly without crushing it. However, a thin slab of such material is usually so limp that when fastened to one end of a handle as a flap it will flop over on one side or the other so much that it is difficult to strike an accurate blow at a fly with it. While a thin slab of rubber sufficiently soft to kill a fly without crushing it is too flexible or limp when used alone as a fly swatter flap, a certain amount of flexibility in a fly swatter flap is essential for reasons well known to those skilled in the art.

Another object of the present invention is the provision of stiffening means having a satisfactory flexibility which is suited to be inclosed between two thin slabs of soft material such as sponge rubber which constitute the flap of a fly swatter without noticeably increasing its over all thickness or preventing the slabs from being securely cemented together back to back.

A further object of my invention is to provide fly swatters of improved appearance which can be readily made in different fast colors, and which can be easily cleaned.

Ordinary porous sponge rubber soft enough to kill a fly without crushing it is well suited in most respects for fly swatter flaps but such rubber usually has physical characteristics whereby a relatively thin slab of it if fastened directly to a usual small, stiff handle tends to break or tear off in use. To provide satisfactory means for securely fastening a thin slab of porous sponge rubber on the end of a fly swatter handle is another object of my invention. In accomplishing this and other objects of my invention, it is a feature of the invention to secure the sponge rubber slab strongly to a fastening and stiffening means having a larger surface area than an equal length of the handle, and to secure the stiffening means to the end of a handle member, whereby the sponge rubber is not subjected to severe rupturing strains when a blow is struck with the fly swatter.

Another feature of my invention resides in the provision of a wire netting stiffening means in a sponge rubber fly swatter arranged with a mesh which enables the small flexible interwoven wires to cooperatively brace and stiffen each other and which also permits sponge rubber slabs to be securely cemented together back to back with the netting between them. Such a stiffening means is well suited for use with slabs of other flap material such as soft, open fibre felt.

Another feature of my invention resides in the provision of a resilient spring stiffening means for a sponge rubber fly swatter flap which permits the flap of the swatter to be bent to approximately the same extent as could be done were the stiffening means omitted.

Another feature of my invention resides in the provision of improved means and methods for fastening a soft piece of sponge rubber on a much smaller metal member so that the sponge rubber piece is held in operative position on the member with sufficient firmness and rigidity to prevent wobbling of the rubber piece relative to the metal member when the two elements are moved together rapidly as they would be when used, for example, as a flap and handle of a fly swatter.

Another feature of my invention resides in the provision of means for operatively fastening a fly swatter flap of sponge rubber to a suitable handle so as to leave each work face of the flap as a substantial plane, i. e. flat area.

Other features and advantages will appear hereinafter.

The present application is a continuation in part of application Serial Number 550,715, filed July 14, 1931 for Letters Patent on improvements in Fly swatters.

Referring to the drawing which forms a part of the specification: Figure 1 is a partial front elevational view of a sponge rubber fly swatter embodying my invention. In this view, part of the sponge rubber facing element is shown broken away to better illustrate the construction of the fly swatter. Figure 2 is a cross-section along the line 2—2 of Figure 1. Figure 3 is a partial front elevational view of another form of sponge rubber fly swatter embodying my invention. In this view, as in Figure 1, part of the sponge rubber facing element is shown broken away to more clearly illustrate the construction of the fly swatter. Figure 4 is an upper end view of the structure shown in Figure 3. Figure 5 is a partial cross-section on an enlarged scale taken along the line 5—5 of Figure 3. Figure 6 is a partial enlarged cross-section similar to Figure 5, and illustrates another construction of a fly swatter flap embodying my invention. Figure 7 is a partial front elevational view of a sponge rubber fly swatter embodying my invention wherein a stiffening means is used for the sponge rubber flap that is different from the stiffening means disclosed in Figure 3. Figure 8 is a partial cross-section taken along the line 8—8 of Figure 7. Figure 9 is a cross-section on an enlarged scale taken along the line 9—9 of Figure 7. Figure 10 is a partial front elevational view illustrating another embodiment of my invention.

According to one way my invention may be carried out, a flap F may comprise two slabs or sheets 3 and 3' of soft sponge rubber secured together, back to back, by cementing or vulcanizing methods well known in the rubber art. Each slab is secured tightly against a flexible wire stiffener 4 disposed between the slabs. A handle H may be constructed of a length of suitable wire formed as indicated in Figure 1 or in any other suitable well known way to have two end portions of the wire disposed between the slabs 3 and 3'. The ends of the wire stiffener 4 are securely fastened to the ends of the wire in the handle H. The fastening operation may be performed by well known welding or soldering methods so as to render the wire member 4, in effect, an integral extension of the wire in the handle H. If desired, the end portions of the wire handle H, which are ordinarily of larger diameter than the wire 4 may each be formed with a short lengthwise bore or recess into which recesses short end portions of the wire 4 may be inserted; and the surrounding portions of the larger wire of the handle may be crimped or mashed tightly about the inserted portions of the wire 4. Suitable holes 6 through the flap F are provided to decrease any tendency of the flap to cause a draft when it is swung at a fly or other insect.

The slabs 3 and 3' each is preferably constructed to have a rind or skin element 7. These skin elements are abutted against each other with the wire 4 disposed therebetween when the slabs are cemented or vulcanized together as noted hereinbefore. Such an arrangement of the skins 7 abutting each other on opposite sides of the stiffener 4 is very advantageous since it makes for a stronger joining of the slabs 3 and 3' to each other, and a stronger fastening of the flap F to the stiffener 4 and, in effect, to the handle H than would ordinarily be secured if the skin elements 7 were omitted. In Figure 2, the skin elements 7 are shown slightly separated to better illustrate their relation to the wire stiffener 4.

The arrangement of the rind elements 7 as described above provides still another important advantage. They serve to provide additional stiffening means for the flap F. Such stiffening effect as is obtained because of the skin elements 7 is caused partly by the action of the skin elements alone, and partly by the coaction of the skin elements and the stiffener. It will be understood by those skilled in the production and the use of sponge rubber that, if desired, the skin elements 7 may be made of a material thickness such as will add considerable stiffness to the flap F. It can be readily seen that the stiffener 4 need not extend as far forwardly or upwardly into the flap, as viewed in Figure 1, and especially in cases where thicker and stiffer rind elements 7 are provided.

The outer faces of the slabs 3 and 3' in most cases will have no skin elements, which construction usually makes for a more attractive appearance of the flap and also decreases to some extent the tendency of the flap to create a draft ahead of it when swung at a fly or other insect.

In another form my invention may take, a fly swatter with a flap or body element generally designated as 10 is preferably made up in two parts 11 and 12 which may be duplicates of each other except as hereinafter noted. These body parts will preferably be made of light weight soft sponge rubber having small pores or cells. For striking a fly (not shown) with the flap 10, a handle is provided which may include a usual round piece of wood 13 connected with the flap 10 by devices including one or more stiff wire members 14 which may have two end portions 15 embedded in the handle piece 13 in a well known way.

The upper end of the wire 14 may be arranged in a triangular form or portion 16 as illustrated in Figure 3 to correspond with and be inclosed in a skirtlike or lower portion 10s of the body or flap 10. It is desirable to securely fasten the limp sponge rubber flap 10 to the stiff wire 14 by means which will normally hold the flap approximately in the same plane as the wire 14 while leaving the flap with some flexibility. To attain these ends, I fold lower corner portions 17 of a rectangular section of flexible wire netting N about the triangular wire form 16. The folded over portions 17 may be fastened to the adjoining portion of the netting by a wire clip (not shown) or other well known instrumentalities. Such fastening instrumentalities will ordinarily not be required however, as will appear hereinafter.

For a purpose to presently appear, the netting N will preferably have a mesh as large or larger than the mesh of metallic wire netting commonly used in fly swatters. It will be understood that netting of other material than metallic wire can be used as a stiffener in practicing my invention.

The shapes and areas of the flap parts 11 and 12 will be such that when they are centrally positioned with respect to the netting N, one against each side of it, the edges of the flap parts 11 and 12 will extend out at all points a considerable distance beyond the edges of the netting N thus fully concealing the latter along its edges. This distance between an edge of the netting and the adjacent edge of the swatter will be preferably not less than the thickness of the swatter and may be several times this thickness. In some cases, the netting N may be omitted entirely and the triangular portion 16 enlarged and extended further up into the flap. In such cases, it may be desirable to flatten the wire portion 16 to some extent if the wire handle is made from usual round wire.

Each of the sponge rubber flap parts 11 and 12 will have a plurality of closely spaced holes or apertures 18 extending entirely through it. The diameter of the holes 18 will preferably be less than the length of an ordinary house fly. A plurality of closely spaced holes 19 smaller than the holes 18 may be provided along the side edges of the flap. When the two flap parts 11 and 12 are properly placed with respect to each other the holes 18 and 19 in the part 11 will register with corresponding holes 18 and 19 in the part 12. When thus positioned the parts 11 and 12 may be cemented together at all contacting points by any kind of suitable cement or glue or by vulcanizing in a well known way. The parts will preferably be pressed together firmly enough so that a small portion of the flap part 11 will be brought into engagement with a corresponding portion of the flap part 12 through substantially each and every mesh opening of the netting N. Care should be taken that all portions of one flap part which extend out beyond the netting N should be securely cemented to corresponding contacting portions of the other flap part.

When the parts 11 and 12 are properly cemented together the holes 18 and 19 will extend all the way through the flap 10 of the fly swatter and prevent the latter from acting as a fan and creating a draft of air ahead of it to warn a fly or even blow the fly out of the range of the fly swatter. It has been found in practice however, that an unperforated sponge rubber flap creates less draft than the same size flap of smooth material like paper, and also that flies can be effectively hit by a small unperforated sponge rubber flap when it is suitably stiffened and mounted on a suitable handle.

Portions of the netting N may appear in some or all of the holes 18 but this will not appreciably close the holes to the passage of air through them since the individual wires of the netting are ordinarily relatively fine as compared to the diameter of the holes. The diameter of a hole 18 is quite small however, and the portions of the wire netting N exposed in the holes 18 cannot scratch or mar a surface or object struck by the fly swatter. To the same end, the hand piece 13 will preferably be made of soft wood or other suitable soft material, and the wires 14 may be covered or sheathed in cloth or other suitable soft material.

Wire netting of the metallic kind commonly employed in fly swatters when used as described above as stiffening means for limp sponge rubber flap parts of a fly swatter will not noticeably increase the overall thickness of the flap and will in effect, remove its limpness sufficiently to permit an effective blow to be struck with the fly swatter. The use of such wire netting in combination with the sponge rubber flap parts on each side of it is also advantageous because of permitting the flap parts when cemented together to grip the netting to the wire part 16.

As indicated in Figure 5, the body part 11 may be made of a differently colored sponge rubber from that of the body part 12. As can be readily seen by those skilled in the manufacture of sponge rubber fly swatters embodying my invention can be conveniently and economically made in several different and fast colors and such fly swatters can be easily cleaned with water and ordinary soap.

As illustrated in Figure 6, a fly swatter embodying my invention may have its flap constructed of one slab 11' of soft sponge rubber and the other slab 12' of a soft fibrous material such as felt, these slabs being secured together, back to back, with a netting stiffener N' between them.

The slab 12' may comprise a soft slab or pad of fabric made of minute elastic fibers or hair like threads which fibers consist largely of a rubber-like substance. Under certain conditions of manufacture and use it may be advantageous to make both the slab 11' and the slab 12' of soft felt or like material which is inexpensive and relatively permanent.

Another way my invention may be carried out is illustrated in Figures 7, 8, and 9. A perforated sponge rubber fly swatter flap generally designated as 30 is made up of two light body parts 31 and 32 each having a plurality of closely spaced holes or apertures 33 extending through it. The flap 30 is detachably fastened to a wood handle 34 by devices which include male threads provided in one end portion of the handle for engagement in female threads 35 formed in one end of a metallic tubular member 36. Owing to the softness and compressibility of the body parts 31 and 32, and flattening of the member 36 tightly gripped between the body parts, the work faces of the flap will be bulged out only a slight extent as is indicated at 36' in Figure 9. This construction leaves the work faces of the fly swatter very nearly plane surfaces which is desirable, especially where small insects like gnats are to be killed with the swatter. The opposite end of the member 36 is fastened to a U-shaped middle section 37 of a coil spring stiffening member 38.

A secure and inexpensive fastening between the member 36 and the spring member 38 can be made by pressing the end of the tubular member flat with the U-shaped section 37 inside of it as indicated in Figures 7 and 9.

For receiving the outer coil portions of the stiffening member 38, the flap parts 31 and 32 may be formed with half round grooves 40 and 41 respectively in their inner faces (see Figure 8). When the parts 31 and 32 are properly joined the grooves 40 and 41 will register with each other and form concealed passage ways for the outer ends of the stiffening member 38 as indicated in Figure 8. The coiled outer ends of the stiffening member 38 will preferably be close wound and as small as is practicable but will be slightly opened when bent to lie in the curved passage ways shown in Figure 7. The degree of the opening of the coils in the spring member 38 is exaggerated in Figure 7 for sake of clearness and for convenience in illustrating the stiffening member.

The two flap parts 31 and 32 are cemented together with the resilient stiffening member 38 fitting tightly in the passage ways and being slightly strained whereby its outer ends tend to hold the sponge rubber flap 30 flat and taut. It will be noted that a portion of the flattened upper end of the tubular member 36 is disposed between the flap parts 31 and 32 which helps to hold the flap 30 normally in alignment with the handle 34. It can be seen that the fly swatter flap illustrated in Figures 7 and 8 can be bent or twisted without injury almost as much as a single piece of sponge rubber.

In Figure 10 is illustrated another embodiment of my invention. A fly swatter flap 50 having apertures 51 may be essentially like the flap 30 and may be fastened to a wire handle member 52 of well known construrtion made of plain steel wire with a spread or widened portion which affords a better grip on the handle and also permits the swatter to be hung on a wall so that the flap 50 will lie flat against the wall. If desired the diameter of the wires in the handle 52 may be decreased and a greater number of more flexible wires can be twisted together to form the handle. The fastening of the flap 50 to the handle 52 may be obtained by integrally joining coiled spring portions 53 to the handle 52 and disposing them in tightly fitting passage ways 54 provided in the flap 50 in a like manner as the passage ways were provided in the body 30. The stiffening portions 53 need not be coiled if they are made from sufficiently flexible wire.

If desired, the form of my fly swatter illustrated in Figure 1 or in Figure 3 can be easily arranged for use with a detachable handle in the way disclosed in Figure 7. Also, as can be readily seen, the fly swatter illustrated in Figures 1 and 7 can be made with flaps having differently colored faces as shown in Figure 5.

As is well known to those skilled in the manufacture of the sponge rubber, when a piece of it is molded, as the flap portions 31 and 32 would ordinarily be made such a sponge rubber piece is formed with an outer membrane or rind. It can be readily seen that the flaps of Figures 3 and 7 when constructed as set forth hereinbefore will have a double thickness of rind or membrane disposed between the flap or body portions. This construction affords a number of advantages. The flap portions can be secured to each other more strongly, and at a less expense if cement is used. A more uniform and stronger attachment of the body portions to the inclosed stiffening means is secured. The rind portions cooperate with the inclosed stiffening means to increase the stiffness of the flap. Such rind portions as are mentioned above are indicated at R in Figure 9.

For striking accurate blows at a fly, it is important that the flap of a fly swatter be secured to the handle with such firmness that the contacting portions of the flap and handle are held in relatively fixed relation, one to the other. For reasons well known to those skilled in the working of sponge rubber, the usual methods of fastening an ordinary piece of soft rubber to a metal member are not suitable for use with cellular sponge rubber. A firm fastening of a yielding sponge rubber flap member on a metal handle member is secured, according to my invention, in the way described above in connection with the fly swatter structures of Figures 1, 3 and 7, by using the rinds for gripping the member.

In a fly swatter constructed according to the form of my invention illustrated in Figure 3, the wire netting N which serves as a kind of core or frame is braced and tightened by the sponge rubber slab on either side which it serves to stiffen. This result is attained because of the rubber slab being pressed against opposite sides of the netting to force portions of one slab through the mesh openings of the netting into contact with portions of the other slab. This pressure causes the interwoven wires of the netting to bind against each other more firmly. Also the edge portions of the netting do not need binding or edging of the usual kind to prevent the wires from becoming unwoven and loosened. Thus the wire netting is enabled to give better and longer service in holding the limp sponge rubber slabs in an approximately flat condition on the end of the handle for striking effectively at a fly.

In using my fly swatter, the fly struck by its soft body or flap will sometimes only be stunned and should be picked up and disposed of before it recovers from the blow.

Variations may be resorted to within the scope of the invention, and portions of the improvements may be used without others.

Having thus described my invention, I claim:

1. In a fly swatter, in combination, a handle, a flap composed of two slabs of soft sponge rubber cemented together, a flexible stiffener stronger than said slabs fastened to said handle at one end thereof, said stiffener being embedded between said slabs and said slabs being secured to said stiffener so that impact strains coming on said slabs are transmitted to said stiffener over large areas of said slabs whereby the danger of such strains rupturing said slabs is decreased.

2. A detachable flap device for a fly swatter handle, said flap device including two slabs of soft sponge rubber, one of said slabs being disposed against the other, face to face, and cemented thereto; a stiffener more flexible than said handle disposed between said slab; and handle-attaching means including a portion thinner than said flap device, engaging said stiffener between said slabs, and a releasable handle-fastening portion stiffer than said stiffener secured to said thin portion and extending outwardly therefrom.

3. A fly swatter including a handle, a limp sponge rubber body, and a flexible wire netting stiffer than said body fastened to said handle and embedded in said body intermediate its sides.

4. A fly swatter including a handle, a flap of soft sponge rubber, means for stiffening said flap including one or more resilient wire members tightly enclosed in said flap, and devices for detachably fastening said handle to said members.

5. A fly swatter including a flap of soft sponge rubber, a wire handle, and stiffening means for said flap including one or more integral extensions of said handle formed in one or more resilient coils and tightly encased in said flap.

6. A fly swatter, comprising a handle and a flap; said handle having an end received within said flap; said flap being formed of flexible sponge rubber, having a portion embracing said end and having said portion vulcanized integral about said end, to hold said flap assembled on said handle; and said fly swatter comprising means for holding said flap operatively extended, and said means including a stiffening insert projecting beyond said end.

7. A fly swatter including a handle, a soft sponge rubber flap, and stiffening devices more flexible than said handle effective for stiffening said flap and for fastening it on said handle.

8. A fly swatter including a handle, a thin, limber sponge rubber flap, and stiffening means terminating short of the outer end of said flap for holding said flap on an end of said handle in operative extended relation thereto while said flap is being swung quickly on said handle at a fly.

9. A fly swatter, comprising a handle and a flap firmly secured on an end of said handle to extend therebeyond; said flap being formed of soft rubber sponge on at least one face, and being more flexible than said handle; and said fly swatter comprising means effective for holding said flap operatively extended while said fly swatter is being operatively moved.

10. A fly swatter including a flexible rubber flap having at least one face of rubber sponge, a relatively stiff handle, and flap supporting means thinner and more flexible than said handle, said means being secured to said handle and embedded in said flap intermediate its work faces.

11. In a fly swatter, in combination, a limber flap including two soft sponge rubber slabs, each having a skin portion on one face, said skin portions being cemented together intermediate the work faces of said flap, a handle member external to said slabs, and means for operatively securing said flap to said handle member, said securing means including a widened extension of said handle member thinner than said flap, said extension being embedded in said flap between said skin portions to be tightly embraced thereby, said skin portions cooperating with said extension to help stiffen said limber flap.

12. A fly swatter including a handle and a flap, said flap being formed of soft sponge rubber, and having a rind arranged between the work faces of said flap, said handle having an extension embedded in said flap against said rind and terminating short of the outer end of said flap, said flap being constructed to press said rind tightly against said extension for cooperation therewith for helping sustain the portion of said flap disposed beyond said extension operatively extended on said handle.

13. A fly swatter comprising a stiff handle, a foraminated flap of yielding, cellular sponge rubber, a stiffening device stronger than said cellular rubber embedded in said flap and secured to one end of said handle, and means for fastening said yielding flap firmly on said handle for assuring accurate movement of said flap by said handle.

14. A fly swatter comprising a stiff wire handle, a flap of yielding, cellular sponge rubber, and means for fastening said yielding flap firmly on said wire handle for assuring accurate movement of said flap by said handle, said means including at least one bent portion of said handle embedded in said flap and rind-like means carried by said flap for gripping said bent portion.

15. A detachable rubber flap device for a fly swatter handle, said flap device including a flap having at least one face formed of sponge rubber, a flexible stiffener embedded in said flap between the work faces thereof, and a connecting means between said stiffener and said handle, said connecting means being permanently and firmly fastened to said stiffener and being constructed for releasable engagement with said handle.

16. A fly swatter including a wire handle, a flap comprising two abutting slabs of soft sponge rubber, each slab having a rind portion on its inner face, and an extension of said wire handle arranged between said slabs for stiffening said flap and securing it to said handle, said extension having at least one bent portion disposed in the plane of said flap, said rind portions being secured, one to another, for engaging said bent portion tightly so that impact strains coming on said flap are transmitted through said rind portions to said handle extension.

17. A fly swatter comprising a handle, a flap of soft sponge rubber more flexible than said handle, and means for holding said flap operatively extended on said handle while said fly swatter is in use.

WILLIAM W. LILLARD.